United States Patent
Hirabayashi

(10) Patent No.: US 7,803,866 B2
(45) Date of Patent: Sep. 28, 2010

(54) RUBBER COMPOSITION FOR TIRE TREAD

(75) Inventor: Kazuya Hirabayashi, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 0 days.

(21) Appl. No.: 12/254,160

(22) Filed: Oct. 20, 2008

(65) Prior Publication Data

US 2009/0105403 A1    Apr. 23, 2009

(30) Foreign Application Priority Data

Oct. 23, 2007    (JP) .............................. 2007-275183

(51) Int. Cl.
*B01F 17/00* (2006.01)
*C08L 23/00* (2006.01)
*B60C 1/00* (2006.01)
*C08K 3/34* (2006.01)
*C08K 3/04* (2006.01)

(52) U.S. Cl. .................. 524/528; 524/492; 524/495

(58) Field of Classification Search ................ 524/492, 524/528, 495

See application file for complete search history.

(56) References Cited

U.S. PATENT DOCUMENTS

2002/0132926 A1*   9/2002   Scholl et al. ................ 525/242
2004/0034159 A1*   2/2004   Brandsch et al. ............ 524/571
2005/0209390 A1*   9/2005   Yagi et al. .................... 524/493
2006/0060285 A1*   3/2006   Weydert et al. ............. 152/905

FOREIGN PATENT DOCUMENTS

| JP | 07-090123 | 4/1995 |
| JP | 2006-160884 | 6/2006 |
| JP | 2006-213747 | 8/2006 |
| JP | 2007-099932 | 4/2007 |

\* cited by examiner

*Primary Examiner*—Mark Eashoo
*Assistant Examiner*—Angela C Scott
(74) *Attorney, Agent, or Firm*—Fish & Richardson P.C.

(57) ABSTRACT

A rubber composition for a tire tread which improves grip performance on dry pavement and wet pavement and driveability is provided. The rubber composition includes 100 parts by weight of a rubber component comprising from 50 to 95 parts by weight of a copolymer rubber having a glass transition point of −40° C. or higher obtained by copolymerization of 1,3-butadiene with styrene using an organic lithium compound as an initiator, from 5 to 20 parts by weight of an epoxidized natural rubber having a degree of epoxidation of from 5 to 60% by weight, and from 0 to 45 parts by weight of other diene rubber; from 20 to 100 parts by weight of silica; and from 0 to 100 parts by weight of carbon black, the total amount of silica and carbon black being from 70 to 150 parts by weight, and further includes a silane coupling agent in an amount of from 2 to 25 parts by weight per 100 parts by weight of the silica.

6 Claims, No Drawings

RUBBER COMPOSITION FOR TIRE TREAD

CROSS-REFERENCE TO RELATED APPLICATIONS

This application is based upon and claims the benefit of priority from the prior Japanese Patent Application No. 2007-275183, filed on Oct. 23, 2007; the entire contents of which are incorporated herein by reference.

BACKGROUND

The present invention relates to a rubber composition used as a tread rubber of a pneumatic tire.

Grip performance (including braking performance) and driveability on dry pavement and wet pavement are required in high level in a pneumatic tire, particularly a high performance tire.

In generally, a technique of increasing a compounding amount of a filler and an oil is used to improve grip performance on wet pavement and dry pavement. In such a case, heat build-up and abrasion resistance are decreased. Furthermore, viscosity in an unvulcanized state is elevated and dispersibility of a filler deteriorates. As a result, to obtain sufficient performance, the number of mixing is increased, resulting deterioration of workability. Using a polymer having high glass transition point as a rubber component is considered as other technique. Such a case leads to deterioration of heat build-up and abrasion resistance, and due to deterioration of temperature dependency, deterioration of driveability on dry pavement is induced.

To improve grip performance on wet pavement, silica is generally used. However, when silica is used, workability greatly deteriorates, such as increase of the number of mixing or decrease of extrusion speed (see JP-A-2006-213747 (kokai) and JP-A-2006-160884 (kokai), the entire contents of those references being incorporated herein by reference). To such problems, it is known that a specific silane coupling agent is compounded, and this makes it possible to improve incorporation of silica in a rubber component during mixing and dispersibility of silica while maintaining grip performance on wet pavement and dry pavement, thereby improving workability and heat generation characteristics. However, due to improvement of dispersibility of silica, hardness and dynamic modulus E' are decreased, and as a result, there is fear of deterioration of driveability on dry pavement.

On the other hand, as a technique to improve driveability on dry pavement, it is considered to increase rubber hardness by, for example, increasing the amount of a filler, decreasing the amount of an oil or adding a hardener. In such a case, grip performance on wet pavement deteriorates.

JP-A-07-90123 (kokai) (the entire contents of this reference being incorporated herein by reference) discloses a rubber composition for a tire tread, having excellent characteristics of abrasion resistance, rolling resistance and wet skid resistance comprising 100 parts by weight of a rubber component comprising from 20 to 50 parts by weight of a natural rubber, from 20 to 40 parts by weight of a styrene-butadiene rubber comprising from 35 to 80% by weight of a vinyl content of a butadiene moiety and from 10 to 40% by weight of a styrene content, and from 20 to 40 parts by weight of an epoxidized natural rubber having a degree of epoxidation of from 10 to 60% by weight, and from 30 to 70 parts by weight of silica compounded with the rubber component.

However, the rubber composition disclosed in JP-A-07-90123 comprises a natural rubber as a main component of a rubber, and the epoxidized natural rubber is used in relatively large amount. Furthermore, the styrene-butadiene rubber used in combination with the epoxidized natural rubber is a rubber having relatively low glass transition point. For this reason, this reference does not disclose to combine a relatively small amount of the epoxidized natural rubber with a specific styrene-butadiene rubber having high glass transition point, and further does not suggest that grip performance on dry pavement and wet pavement and driveability can be improved by such a combination.

SUMMARY

The present invention has been made in view of the above circumstances. An aspect of the present invention is to improve grip performance on dry pavement and wet pavement and driveability.

According to the aspect of the present invention, there is provided a rubber composition for a tire tread, comprising 100 parts by weight of a rubber component comprising from 50 to 95 parts by weight of a copolymer rubber having a glass transition point of −40° C. or higher obtained by copolymerization of 1,3-butadiene with styrene using an organic lithium compound as an initiator, from 5 to 20 parts by weight of an epoxidized natural rubber having a degree of epoxidation of from 5 to 60% by weight, and from 0 to 45 parts by weight of other diene rubber; from 20 to 100 parts by weight of silica; and from 0 to 100 parts by weight of carbon black, the total amount of silica and carbon black being from 70 to 150 parts by weight, and further comprising a silane coupling agent in an amount of from 2 to 25 parts by weight per 100 parts by weight of the silica.

According to other aspect of the present invention, there is provided a pneumatic tire having a tread comprising the rubber composition.

According to the aspects of the present invention, by combining a relatively small amount of an epoxidized natural rubber with a specific styrene-butadiene rubber having high glass transition point, both driveability and grip performance on dry pavement and wet pavement can simultaneously be improved.

DETAILED DESCRIPTION

The embodiments of the present invention are described in detail below.

In the rubber composition according to the aspect of the present invention, a copolymer rubber used as a first component of a rubber component is a styrene-butadiene rubber (SBR) obtained by copolymerization of 1,3-butadiene with styrene using an organic lithium compound as an initiator, that is, a solution polymerized SBR. The copolymer rubber can be produced by the conventional solution polymerization method using an inert organic solvent such as pentane, hexane, heptane, benzene, toluene or diethyl ether. Examples of the organic lithium compound include alkyl lithium such as n-butyl lithium; alkylene dilithium such as 1,4-dilithium butane; and phenyl lithium. The copolymer rubber may be that chain ends of the copolymer are treated with a tin coupling agent, a silicon coupling agent or an alkoxysilane coupling agent, or alternatively ends or main chain are modified with a functional group (such as hydroxyl group or amino group) having interaction and chemical reactivity with silanol group of silica.

The copolymer rubber used is a copolymer rubber having a glass transition point (Tg) of −40° C. or higher. The grip performance on wet pavement and dry pavement can be improved by using the copolymer rubber having high glass transition point. The upper limit of the glass transition point is not particularly limited, but generally is 0° C. or lower. The glass transition point used herein is a value measured using differential scanning calorimetry (DSC) according to JIS K7121 (temperature rising rate: 20° C./min).

In the rubber composition according to the aspect of the present invention, the epoxidized natural rubber used as a second component of the rubber component is a rubber that an epoxy group is incorporated into a double bond of the main chain of a natural rubber. The epoxidized natural rubber is obtained by, for example, reacting peracetic acid with a natural rubber latex. Grip performance on dry pavement and wet pavement and driveability can be improved by compounding such an epoxidized natural rubber.

The epoxidized natural rubber used has a degree of epoxidation of from 5 to 60% by weight, and preferably from 20 to 55% by weight. Where the degree of epoxidation is too low, the above effect of improving grip performance and driveability is not obtained. On the other hand, where the degree of epoxidation is too high, processability deteriorates.

In the rubber composition, other diene rubber may be added as a third component of the rubber component, although not an essential component. The other diene rubber is not particularly limited so long as it is a diene rubber other than the copolymer rubber of the first component and the epoxidized natural rubber of the second component. Examples of the other diene rubber include a styrene-butadiene rubber other than the above copolymer rubber, an unmodified natural rubber, an isoprene rubber, a butadiene rubber, a styrene-isoprene copolymer rubber, a butadiene-isoprene copolymer rubber and a styrene-isoprene-butadiene copolymer rubber. Those may be used alone or as mixtures of two or more thereof.

In the rubber composition, the rubber component comprises from 50 to 95% by weight of the copolymer rubber as the first component, from 5 to 20% by weight of the epoxidized natural rubber as the second component, and from 0 to 45% by weight of the other diene rubber as the third component which is not essential. Where the compounding proportion of the epoxidized natural rubber is less than the above range, the effect of improving grip performance and driveability as described above is not obtained. On the other hand, the compounding proportion is larger the above range, workability at the time of rubber processing is impaired, and abrasion resistance deteriorates. The rubber component preferably comprises from 50 to 80% by weight of the copolymer rubber as the first component, from 5 to 15% by weight of the epoxidized natural rubber as the second component, and from 10 to 35% by weight of the other diene rubber as the third component.

The silica used in the rubber composition is not particularly limited. Examples of the silica include wet silica, dry silica, colloidal silica and precipitated silica. In particular, wet silica comprising hydrous silicic acid as a main component is preferably used. The silica is preferably compounded in an amount of from 20 to 100 parts by weight per 100 parts by weight of the rubber component. The more preferred compounding amount of the silica is that the lower limit is 40 parts by weight and the upper limit is 90 parts by weight. Where the compounding amount of the silica is less than 20 parts by weight, a sufficient improvement effect of grip performance is not obtained.

In the rubber composition according to the aspect of the present invention, the filler may be the silica alone, but carbon black may be compounded together with the silica. The carbon black is preferably compounded in an amount of from 0 to 100 parts by weight per 100 parts by weight of the rubber component. Furthermore, the silica and the carbon black are preferably compounded in the total amount of from 70 to 150 parts by weight. In the rubber composition, other than the above silica and carbon black, other fillers such as titanium oxide, aluminum silicate, clay or talc can be compounded as the filler.

The silane coupling agent used in the rubber composition acts to bond silica and the rubber component, and is an organic silane compound having an organic moiety capable of reacting with a polymer, such as a sulfide, an amino group, a mercapto group, a vinyl group, a methacryl group or an epoxy group, and a halogen, an alkoxy group or the like. The conventional various silane coupling agents can be used. Specific examples of the silane coupling agent used include bis (3-triethoxysilylpropyl)tetrasulfide, bis(3-triethoxysilylpropyl)disulfide, bis(2-triethoxysilylethyl)tetrasulfide, 3-marcaptopropyl trimethoxysilane, 3-marcaptopropyl triethoxysilane, 3-nitropropyl trimethoxysilane and γ-aminopropyl triethoxysilane.

The compounding amount of the silane coupling agent is from 2 to 25 parts by weight, and more preferably from 5 to 15 parts by weight, per 100 parts by weight of the silica, in the point of sufficiently exhibiting the advantages of the present invention described above.

Other than the components described above, various additives generally used in a rubber composition for a tire tread, such as softeners, plasticizers, age resisters, zinc white, stearic acid, vulcanizing agents or vulcanization accelerators can be compounded with the rubber composition according to the aspect of the present invention.

The rubber composition comprising the above constitution is preferably used as a rubber composition for a tread of a pneumatic tire, particularly a high performance pneumatic tire (for example, a racing tire), and can form the tread by vulcanization molding according to the conventional method.

EXAMPLES

The embodiments of the present invention are described below, but the invention is not limited to those embodiments.

Using Banbury mixer, a rubber composition for a tire tread was prepared according to the formulation shown in Table 1. Each component in Table 1 is as follows.

SBR1: Solution polymerized SBR, VSL5025-OHM (glass transition point Tg: −15° C.), manufactured by Lanxess SBR2: Solution polymerized SBR, TUFDENE E50 (glass transition point Tg: −30° C.), manufactured by Asahi Kasei Corporation SBR3: SBR1502 (glass transition point Tg: −66° C.), manufactured by JSR Corporation ENR1: Epoxidized natural rubber, ENR25 (degree of epoxidation: 25% by weight), manufactured by MRPRA ENR2: Epoxidized natural rubber, ENR50 (degree of epoxidation: 50% by weight), manufactured by MRPRA Carbon black: DIABLACK N234, manufactured by Mitsubishi Chemical Corporation Silica: NIPSEAL AQ, manufactured by Tosoh Silica Corporation Silane coupling agent: bis (3-triethoxysilylpropyl) disulfide, Si-75, manufactured by Degussa As the common formulation, 40 parts by weight of an oil (JOMO PROCESS NC-140, manufactured by Japan Energy Corporation), 2 parts of stearic acid (RUNAX S-20, manufactured by Kao Corporation), 3 parts by weight of zinc white (Zinc White #1, manufactured by Mitsui Mining & Smelting Co., Ltd.), 2 parts by weight of an age resister (SANTOFLEX 6PPD, manufactured by FLEXSYS), 2 parts by weight of a wax (OZOACE 0355, manufactured by Nippon Seiro Co., Ltd.), 1.5 parts by weight of a vulcanization accelerator (NOCCELLAR CZ-G, manufactured by Ouchi Shinko Chemical Industrial Co., Ltd.) and 2.1 parts by weight of sulfur (powdery sulfur 150 mesh, manufactured by Hosoi Chemical Industry Co., Ltd.) were compounded with 100 parts by weight of a rubber component in each rubber composition.

Processability of each rubber composition obtained was evaluated, and a pneumatic radial tire was prepared using each rubber composition. The tire had a size of 225/45ZR17, and each rubber composition was applied to its tread, and vulcanization molded according to the conventional method to produce a tire. Grip performance (wet grip property and dry grip property) on wet pavement and dry pavement and driveability on dry pavement and abrasion resistance of each tire obtained were evaluated. Each evaluation method is as follows.

Processability: Processability was evaluated by a Mooney viscosity measured with a Mooney viscometer, manufactured by Shimadzu Corporation. The test method was according to JIS K6300. The processability was indicated by an inverse index as the value of Comparative Example 1 being 100. Viscosity is low and processability is good as the value is large.

Grip performance: Four tires obtained above were used in a 2500 cc sedan, and the sedan was run on a road surface on which water was sprayed in a depth of 2 to 3 mm in wet grip property and on dry pavement in dry grip property. Friction coefficient was measured at 100 km per hour, and each grip property was evaluated. The grip performance was indicated by an index as the value of Comparative Example 1 being 100. The grip performance is good as the value is large.

Driveability on dry pavement: Four tires obtained above were used in a 2500 cc sedan, and a driver in charge of a sensory test drove the car on a test course at high speed while paying attention to steering responsiveness, running stability and the like, and evaluated driveability. The results were indicated that as compared with Comparative Example 1 as control, excellent driveability was indicated "+2", slightly excellent driveability was indicated "+1", comparable driveability was indicated "±0", slightly poor driveability was indicated "−1", and poor driveability was indicated "−2".

Abrasion resistance: Four tires of each kind were used in 2,500 cc sedan, and tire rotation was conducted every running distance of 2,500 km. The residual depth (average value of four tires) of treads after running 10,000 km was obtained. The result was indicated by an index as the value of Comparative Example 1 being 100. The abrasion resistance is excellent as the index is large.

TABLE 1

| | | Comparative Example 1 | Comparative Example 2 | Example 1 | Example 2 | Example 3 | Example 4 | Example 5 |
|---|---|---|---|---|---|---|---|---|
| Compounding amount (parts by weight) | SBR1 (Tg: −15° C.) | 60 | 60 | 60 | 60 | 60 | 60 | 60 |
| | SRB2 (Tg: −30° C.) | | | | | | | |
| | SBR3 (Tg: −66° C.) | 40 | 40 | 35 | 30 | 25 | 35 | 30 |
| | ENR1 (degree of modification: 25%) | | | 5 | 10 | 15 | | |
| | ENR2 (degree of modification: 50%) | | | | | | 5 | 10 |
| | Carbon black | 90 | 20 | 20 | 20 | 20 | 20 | 20 |
| | Silica | | 70 | 70 | 70 | 70 | 70 | 70 |
| | Silane coupling agent | | 7 | 7 | 7 | 7 | 7 | 7 |
| Processability | | 100 | 98 | 96 | 94 | 92 | 94 | 92 |
| Wet grip property | | 100 | 105 | 107 | 109 | 110 | 109 | 113 |
| Dry grip property | | 100 | 103 | 107 | 109 | 111 | 110 | 114 |
| Driveability | | ±0 | ±0 | +1 | +1 | +2 | +1 | +2 |
| Abrasion resistance | | 100 | 102 | 97 | 94 | 91 | 93 | 90 |

| | | Comparative Example 3 | Comparative Example 4 | Comparative Example 5 | Example 6 | Example 7 | Example 8 |
|---|---|---|---|---|---|---|---|
| Compounding amount (parts by weight) | SBR1 (Tg: −15° C.) | 60 | 10 | | | | |
| | SRB2 (Tg: −30° C.) | | | 80 | 80 | 80 | 80 |
| | SBR3 (Tg: −66° C.) | | 80 | 20 | 15 | 10 | 5 |
| | ENR1 (degree of modification: 25%) | 40 | 10 | | 5 | 10 | 15 |
| | ENR2 (degree of modification: 50%) | | | | | | |
| | Carbon black | 20 | 20 | 20 | 20 | 20 | 20 |
| | Silica | 70 | 70 | 70 | 70 | 70 | 70 |
| | Silane coupling agent | 7 | 7 | 7 | 7 | 7 | 7 |
| Processability | | 92 | 98 | 99 | 96 | 93 | 91 |
| Wet grip property | | 113 | 102 | 102 | 105 | 107 | 110 |
| Dry grip property | | 115 | 101 | 101 | 104 | 107 | 109 |
| Driveability | | +2 | ±0 | ±0 | +1 | +1 | +2 |
| Abrasion resistance | | 80 | 100 | 105 | 100 | 97 | 93 |

The results are shown in Table 1 above, and according to the embodiments of the present invention, grip performance on wet pavement and dry pavement can be improved, while suppressing deterioration of workability in rubber processing, as compared with Comparative Examples 1 as a control. Simultaneously, driveability on dry pavement can be improved.

The rubber composition for a tire tread according to the aspect of the present invention can preferably be used in a tread of a pneumatic tire, and is particularly preferred as a tread rubber of a high performance radial tire.

What is claimed is:

1. A rubber composition for a tire tread, comprising:
   100 parts by weight of a rubber component comprising from 50 to 95 parts by weight of a copolymer rubber having a glass transition point of −15° C. or higher obtained by copolymerization of 1,3-butadiene with styrene using an organic lithium compound as an initiator, from 5 to 20 parts by weight of an epoxidized natural rubber having a degree of epoxidation of from 5 to 60% by weight, and from 0 to 45 parts by weight of other diene rubber;
   from 20 to 100 parts by weight of silica; and
   from 0 to 100 parts by weight of carbon black, the total amount of silica and carbon black being from 70 to 150 parts by weight, and
   further comprising a silane coupling agent in an amount of from 2 to 25 parts by weight per 100 parts by weight of the silica.

2. The rubber composition for a tire tread as claimed in claim 1, wherein the degree of epoxidation of the epoxidized natural rubber is from 20 to 55% by weight.

3. A pneumatic tire having a tread comprising the rubber composition as claimed in claim 1.

4. A pneumatic tire having a tread comprising the rubber composition as claimed in claim 2.

5. The rubber composition for a tire tread as claimed in claim 1, wherein the rubber component comprises from 50 to 80% by weight of the copolymer rubber, from 5 to 15% by weight of the epoxidized natural rubber, and from 10 to 35% by weight of the other diene rubber.

6. The rubber composition for a tire tread as claimed in claim 5, wherein the other diene rubber is a styrene-butadiene rubber other than the copolymer rubber.

* * * * *